United States Patent [19]
Siri

[11] Patent Number: 6,088,250
[45] Date of Patent: Jul. 11, 2000

[54] POWER CONVERTERS FOR MULTIPLE INPUT POWER SUPPLIES

[75] Inventor: Kasemsan Siri, Torrance, Calif.

[73] Assignee: The Aerospace Corporation, El Segundo, Calif.

[21] Appl. No.: 09/087,537

[22] Filed: May 29, 1998

[51] Int. Cl.[7] .............................. H02M 3/24; H02M 1/00; H01M 10/46

[52] U.S. Cl. .................................. 363/97; 363/21; 320/13

[58] Field of Search .................................. 363/97, 71, 20, 363/21, 16, 17, 132, 65, 67; 323/224, 222, 282; 320/128

[56] References Cited

U.S. PATENT DOCUMENTS

| | | | |
|---|---|---|---|
| 5,751,133 | 5/1998 | Sato et al. .................................. | 320/13 |
| 5,761,057 | 6/1998 | Munchenberger ........................... | 363/21 |

*Primary Examiner*—Peter S. Wong
*Assistant Examiner*—Rajnikant B. Patel
*Attorney, Agent, or Firm*—Derrick Michael Reid

[57] ABSTRACT

An improved power converter employs two conventional charging and discharging switches operating in a complimentary mode and driven by a switch driver controlled by a power factor correction controller. The power converter is firstly improved with a blocking diode for blocking cross coupled short circuit paths to enable multiple converters to drive respective primary windings of an output isolation transformer, and is further modified with an absorption capacitor for providing a discharge path for a switching capacitor connected across the discharging switch so as to enable zero voltage switching of the discharging switch while employing conventional power factor correction, over voltage protection and current limiting. A plurality of improved power converters can be connected between respective input power sources and respective primary windings of the transformer with each converter independently providing power factor correction without cross coupling short circuit paths.

17 Claims, 3 Drawing Sheets

SINGLE SOURCE POWER SUPPLY

SINGLE SOURCE POWER SUPPLY

MULTIPLE SOURCE POWER SUPPLY

SWITCHING TIMING DIAGRAM 6,088,250

POWER CONVERTERS FOR MULTIPLE INPUT POWER SUPPLIES

STATEMENT OF GOVERNMENT INTEREST

The invention was made with Government support under Contract No. F04701-93-C-0094 by the Department of the Air Force. The Government has certain rights in the invention. The invention described herein may be manufactured and used by and for the government of the United States for governmental purpose without payment of royalty therefor.

FIELD OF THE INVENTION

The invention relates to the field of power supplies and more particularly to switching power converters used for power factor correction of supplied power from power sources.

BACKGROUND OF THE INVENTION

Utility power systems deliver power to a number of non-linear loads through switching power supplies. These non-linear loads disadvantageously create significant harmonics upon the utility power buses, resulting in unnecessary losses during power transmission. Power factor correction is used to optimize power transfer with minimum line loss with reduced harmonics. By sensing the instantaneous input current and voltage, the output power can be corrected to maintain a constant supply of power with current and voltage in phase. Active power factor correction in switching converters have been utilized. Power factor correction circuits have been disclosed in U.S. Pat. Nos. 5,301,095, 5,321,600 and 5,045,991.

A boost converter can be operated to draw continuous current with reduced harmonics functioning as line-filtering. The conventional boost converter transfers power to the load without electrical isolation between the utility and the load. The lack of electrical isolation prevents the step-down of the output voltage in a single stage power converter. An isolation transformer is used for electrical isolation. The transformer may be a split transformer having a primary winding and two secondary windings. The primary winding with a center tap is connected to a push pull converter and the secondary windings are connected to the load circuits to provide full-wave rectification and symmetrical operation of the transformer without core saturation using push-pull power switching devices. However, the voltage stresses on push-pull power switching devices are twice the reflected output voltage at either side of the primary windings. Consequently, the push-pull boost converter disadvantageously requires the use of costly switching devices in order to achieve the same conduction losses of the conventional boost converter.

Single-ended modified boost converters are suitable for the power factor correction providing input current shaping and EMI reduction as disclosed in U.S. Pat. No. 5,434,767. A power factor correction (PFC) control circuit provides a constant switching frequency pulse-width-modulated (PWM) signal to a switch driver that drives charging and discharging switching transistors in the boost converter. The PFC control circuit monitors the input current, input voltage and output voltage and varies the PWM signal to perfect power factor correction as well as providing over voltage and current limiting protection. The boost converter provides a step-up or step-down output voltage with electrical isolation using the transformer windings. The boost converter is required to operate at a duty ratio of greater than fifty percent so as to provide sufficient time to reset the transformer core. The benefit of operating the converter at a duty ratio of greater than fifty percent is that the voltage stresses on the switching devices are limited to the reflected output voltage across the primary winding. The transformer turn ratio can be selected to provide step-up or step-down output voltages with desired output voltage regulation in the presence of the restricted duty ratio.

The modified boost converter provides a step-up or step-down output voltages with power factor correction while achieving electrical isolation between the line power source and the output load. This boost converter includes two active switching devices, the charging switch Si and the discharging switch S2, coupled in series with the primary winding. By utilizing parasitic or applied capacitance across the discharging switch S2 connected to magnetizing inductance of the transformer primary winding, resonance occurs within the turn-off interval of the discharging S2 switch, thus facilitating zero-voltage switching of the discharging S2 switch for long term reliability with minimal inductive flyback spikes. The turn-on loss of the conventional charging S1 switch is minimized due to the presence of the leakage inductance of the transformer which allows soft switching when switching the S1 switch by providing a smooth diversion of the input inductor choke current from the primary winding into the charging S1 switch.

While the modified boost converter of U.S. Pat. No. 5,434,767 is suitable for driving single primary winding output transformers with PWM power factor correction with zero voltage switching of the discharging S2 switch, the modified boost converter is not designed to accommodate a plurality of power sources driving a single load. It is now desirable to connect a plurality of power sources to a single load, where the plurality of power sources are used intermittently to provide efficient use of all available power. A multiple source power delivery system may include an AC line power source from a utility, a backup power supply from a battery for when the AC line power fails, and a solar collector power source providing cost effective power collection enabling efficient use of the available power sources. If a plurality of modified boost converters where respectively connected between the plurality of power sources and a plurality of primary windings of an output transformer driving the load, cross coupling of short circuits paths occurs between the primary windings of the transformers causing harmonics and distortion during the operation of the multiple converters defeating efficient power factor correction and efficient power transfer. When a plurality of power sources drive a load, the multiple primary windings would be cross coupled in order to connect the converters to the respective primary windings, but such cross coupled primary windings couple short circuit paths in one boost converter to another boost converter, thereby, disrupting power transfer to the load causing power loss and distortion. These and other disadvantages are solved or reduced using the present invention.

SUMMARY OF THE INVENTION

An object of the invention is to provide a converter which enables power factor correction and power conversion when coupling multiple power sources to a single load.

Another object of the invention is to provide a converter with a blocking means for blocking cross coupled short circuit paths.

Yet another object of the invention is to provide a converter having an absorption means for absorbing energy stored from magnetization inductance to a switching capacitor connected across a discharging switch so that the discharging switch can be switched when the switching capacitor is fully discharged so that the discharging switch is switched at zero volts.

A plurality of improved boost converters are preferably used to respectively connect a plurality of power sources to a single load through respective multiple primary windings of an output transformer having a secondary winding driving the load without adverse cross coupling of short circuit paths between the plurality of converters coupled through the primary windings. The blocking of the short circuit paths enables efficient power factor correction control of the power delivered from the plurality of power sources to the load connected to the secondary winding of the output transformer without short circuit coupling. The plurality of power sources could be for example, a three-phase AC power system, or for example, an AC line and a battery and a solar collector as a composite power delivery system. Each of the power sources is connected to a respective converter driven by a respective converter driver. Each converter driver senses for instantaneous input voltage, output voltage and input current operation to provide power factor correction control using respective pulse-width-modulated (PWM) signals communicated to respective switch drivers complimentarily switching a charging switch and a discharging switch in each converter. The pulse width modulated switching of the charging switch and discharging switch enables power factor correction, in additional to conventional over voltage and current-limiting protection.

In the case of three phase alternating current (AC) line power sources, three respective power boost converters are connected to respective corresponding phases of the input voltage source. The power of the three input power sources is transferred to a single output load through respectively connected primary windings of the output transformer preferably having a split secondary winding connected to an output rectification circuit. This power delivery system may use only one output transformer, operating at a switching frequency cycle much higher than the AC line frequency of the three phase power source, to transfer the power from the three input phases of the input source to the output load with desired isolation and step-up or step-down output voltages. The three power factor correction control circuits, switch drivers and converters operate at the same switching frequency. All of the plurality of converters, such as three converters, are connected to a digital clock signal to provide synchronization between the three converter drivers. Each converter includes a blocking means blocking short circuit paths at predetermined time periods within each switching cycle.

Each of the converter drivers drive the output load by independently adjusting the waveform of the respective input current to be sinusoidally in phase with its respective input voltage for power factor correction. Each converter includes a pair of complimentary switches, the charging switch S1 and the discharging switch S2. In the case of three converters, respective charging switches S1$a$, S1$b$, and S1$c$, and discharging switches S2$a$, S2$b$ and respective S2$c$ are used. Each switch driver of the respective converter driver provides two complimentary switch signals for driving the charging S1 and discharging S2 switches. Turn-on switching of the charging S1$abc$ switches and turn-off of the discharging S2$abc$ switches are synchronized to occur at the beginning of every switching cycle. However, the turn-off switching of the charging S1$abc$ switches and the turn-on of the discharging S2$abc$ switches all occur after the fifty percent duty time, and are staggered to be non-overlapping so that only one of the discharging switches S2$a$, S2$b$ or S2$c$ turns on at any one time. The staggered switching intervals of the turn off charging S1 switches and turn on discharging S2 switches facilitate blocking of the cross coupled short circuit paths potentially created by the converters at respective primary winding connections.

In a first aspect of the invention, each converter includes a blocking means, such as a diode, connected between the input charging inductor and the respective primary winding, so that when the subject converter is charging the charging inductor, coupled primary voltages from the primary windings are blocked and the subject converter does not present a short circuit path to any other converter attempting at the same time to discharge power to the load, so as to not effect the operation of any other converters. The blocking diodes prevent short-circuiting of the primary windings that would occur during unsynchronized turn-off time intervals of the three sets of charging and discharging switches, leading to significant power loss and distortion of the delivered power.

In another aspect of the invention, an absorption capacitor is respectively connected across the blocking diode and another switching capacitor is respectively connected across the discharging S2 switches to maintain zero-voltage switching across the discharging S2 switches in the presence of the blocking diode. The blocking diode would block the discharge of the switching capacitor connected across the discharging switch S2. The absorption capacitor absorbs charge from the switching capacitor fully discharged thereby preserving a zero voltage across the discharging switch S2 at the switching time. The absorption capacitor and switching capacitor in combination with the magnetization inductance of the primary winding create a resonant circuit that controls the discharging of the switching capacitor. During charging, the switching capacitor is initially charged by the magnetization inductance until the switching capacitor starts to then, in resonance, discharge back through the primary winding to the absorption capacitor. The discharging S2 switches are switched when the parallel connected switching capacitor has discharged to zero voltage, so that the discharging S2 switch is switched at zero volts for long term reliability without the generation of large flyback inductive voltage spikes.

The improved boost converter enables the coupling of a plurality of power sources to a single load using PWM power factor correction without the cross coupling of short circuit paths and with zero voltage switching for efficient power transfer to the load. These and other advantages will become more apparent from the following detailed description of the preferred embodiment.

DETAILED DESCRIPTION OF THE PREFERRED EMBODIMENT

Figure 1:
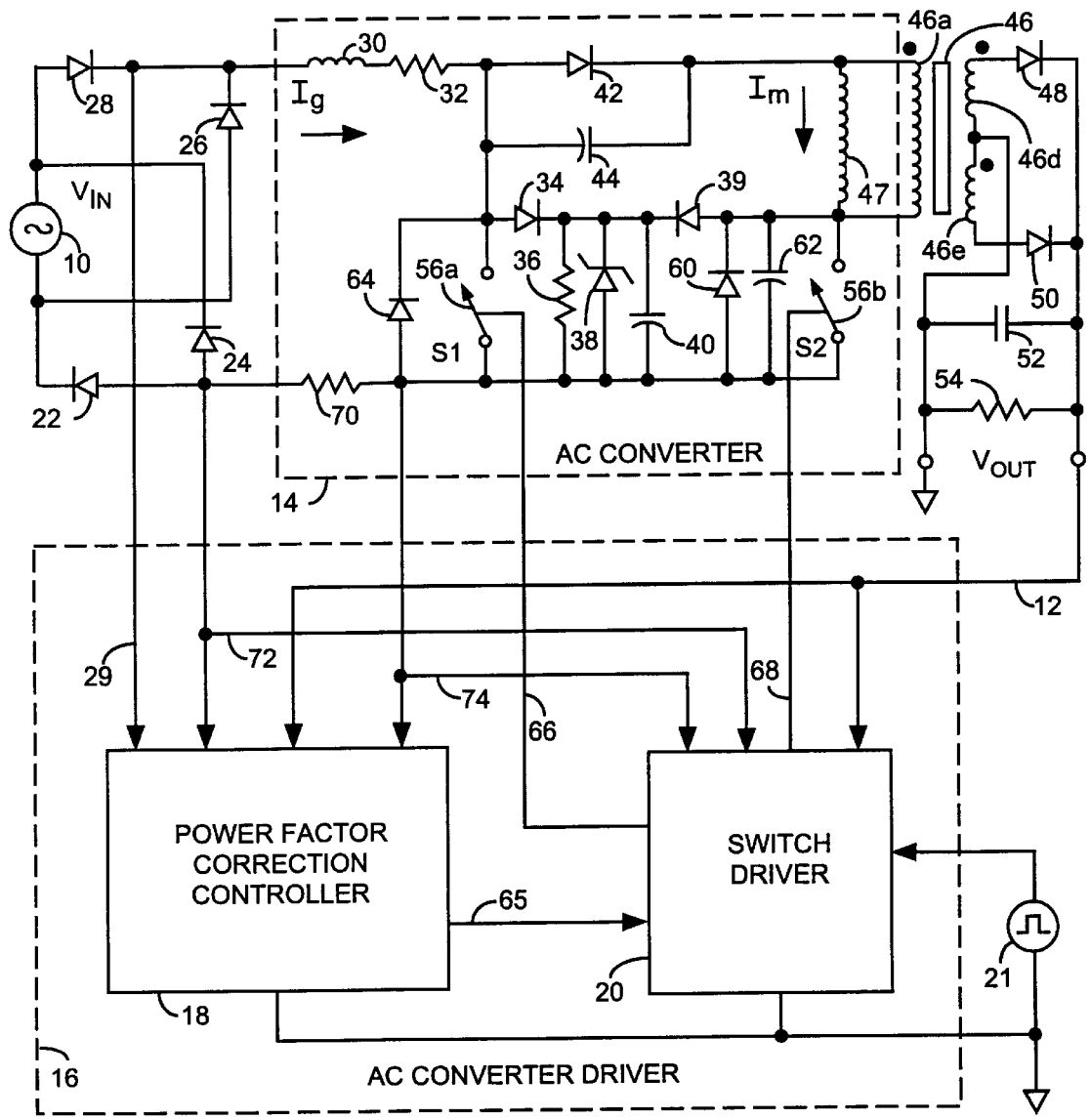
FIG. 1 is a diagram of a single source power supply including an improved converter.

An embodiment of the invention is described with reference to the figures using reference designations as shown in the figures. Referring to FIG. 1, a single source power supply receives power for a power source 10 and couples power to an output load at Vout on line 12 through an AC converter 14 that is driven by an AC converter driver 16 which preferably includes a power factor correction controller 18 and includes a switch driver 20 driven by a synchronization clock signal 21. The clock signal 21 provides a switching cycle of a predetermined time period for synchronized switching during repetitive switching cycles. The input power may be an AC power source 10 providing an input voltage Vin that is rectified using diodes 22, 24, 26 and 28. The cathode terminal of diode 28 also provides an input voltage sense signal 29 to the power factor correction controller 18. The diodes 22, 24, 26 and 28 conduct rectified current Ig through an input charging inductor 30 and resistor 32. The charging inductor 30 is coupled to an improvement blocking diode 42 and absorption capacitor 44 which are connected in parallel between the charging inductor 30 and an output transformer 46 having a primary winding 46a, and two secondary windings 46d and 46e. The transformer 46 is modeled by the addition of magnetization inductor 47 conducting magnetizing current Im.

The diode 34, resistor 36, diode 38, capacitor 40 and diode 39 are for optional internal over voltage protection. The optional components 34, 36, 38, 39 and 40 function to clamp voltage generated from the leakage inductance of the transformer 46. The secondary windings 46d and 46e are connected to output diodes 48 and 50, output capacitor 52 and output resistor 54 providing the output voltage Vout. Components 48, 50, and 52 filter and rectify the output voltage Vout which may be connected to a load represented by resistor 54.

Charging S1 Switch 56a and discharging S2 switch 56b enables power factor correction and power conversion through the AC converter 14. Diodes 60 and 64 are conventional protection diodes for respective switches 56a and 56b. Discharging switch 56b is connected in parallel to a switching capacitor 62 which is charged by magnetization current Im when discharging switch 56b is switched off. Diode 60, when conducting, also retains zero volts across the switching capacitor 62 for zero voltage switching of the discharging S2 switch 56b.

The power factor controller 18 controls the operation of the switch driver 20 using a pulse width modulated control signal 65. The switch driver 14 controls the operation of the switches 56a and 56b using control lines 66 and 68, respectively, which are operated in a complimentary operational mode. Switch 56a is on when switch 56b is off, and switch 56a is off when switch 56b is on, using respective switching control lines 66 and 68. A current sense resistor 70 provides a current sense voltage across lines 72 and 74 so that the instantaneous current in the converter 14 can be sensed and monitored by the controller 18 and driver 20. The converter 14 and driver 20 also sense the output voltage Vout on line 12. The AC converter driver 14 thus senses the instantaneous current through resistor 70 over lines 72 and 74, senses the instantaneous input voltage vin over line 29, senses the instantaneous output voltage Vout on line 12, and controls the operation of the switches 56a and 56b, using the PWM signal 65 to enable boost conversion with power factor correction.

Practical operation of a properly designed converter would exhibit some losses due to non-zero voltage drops across switches and diodes but still reflects similar circuit responses as those described for an ideal operation. During operation of the converter 14 when an AC line source Vin is provided, the switch 56a is closed during the first half of the switching cycle, when switch 56b is open, so that the charging current Ig increases through the charging inductor 30, resistor 32 and charging switch 56a. The charging S1 switch 56a is closed for conducting the charging current while the discharging switch 56b is opened. When the charging switch 56a is opened and the discharging switch 56b is simultaneously closed, a portion of the charging current Ig is conducted through the primary winding 46a as a discharge current coupling power to the load 54 through diode 48. Another portion of the charging current is conducted through the magnetization inductor 47 and referred as magnetizing current Im. Thereafter and when the discharging S2 switch again opens, the magnetization current Im charges the switching capacitor 62 to a maximum voltage NVout which is clamped by diode 50. Due to the resonance behavior of capacitors 44 and 62 and the inductance 47, the voltage across discharging switch 56b when opened, firstly increases from zero to the clamped voltage NVout and then decreases back to zero, as the switching capacitor 62 discharges through the inductor 47 into the absorption capacitor 44 providing a resonant discharging path when the switching capacitor 62 discharges to zero volts.

The inductor 30 is charged to store energy in the form of magnetic flux by the charging current conducted through the inductor 30 and charging switch 56a during the at least fifty percent duty cycle, and then this charging current becomes a discharged current discharged into the primary winding 46a and through the discharging switch 56b during the remaining discharging time when switch 56a is open and switch 56b is closed. Diode 42 functions to block a short circuit path created by the switch 56a when closed. This short circuit path is coupled to the primary winding 46a during the charging time. The blocking diode 42 blocks this switch 56a short circuit path from being coupled to the primary winding 46a through diode 60 and through the closed charging S1 switch 56a during the charging of the inductor 30.

Figure 2:
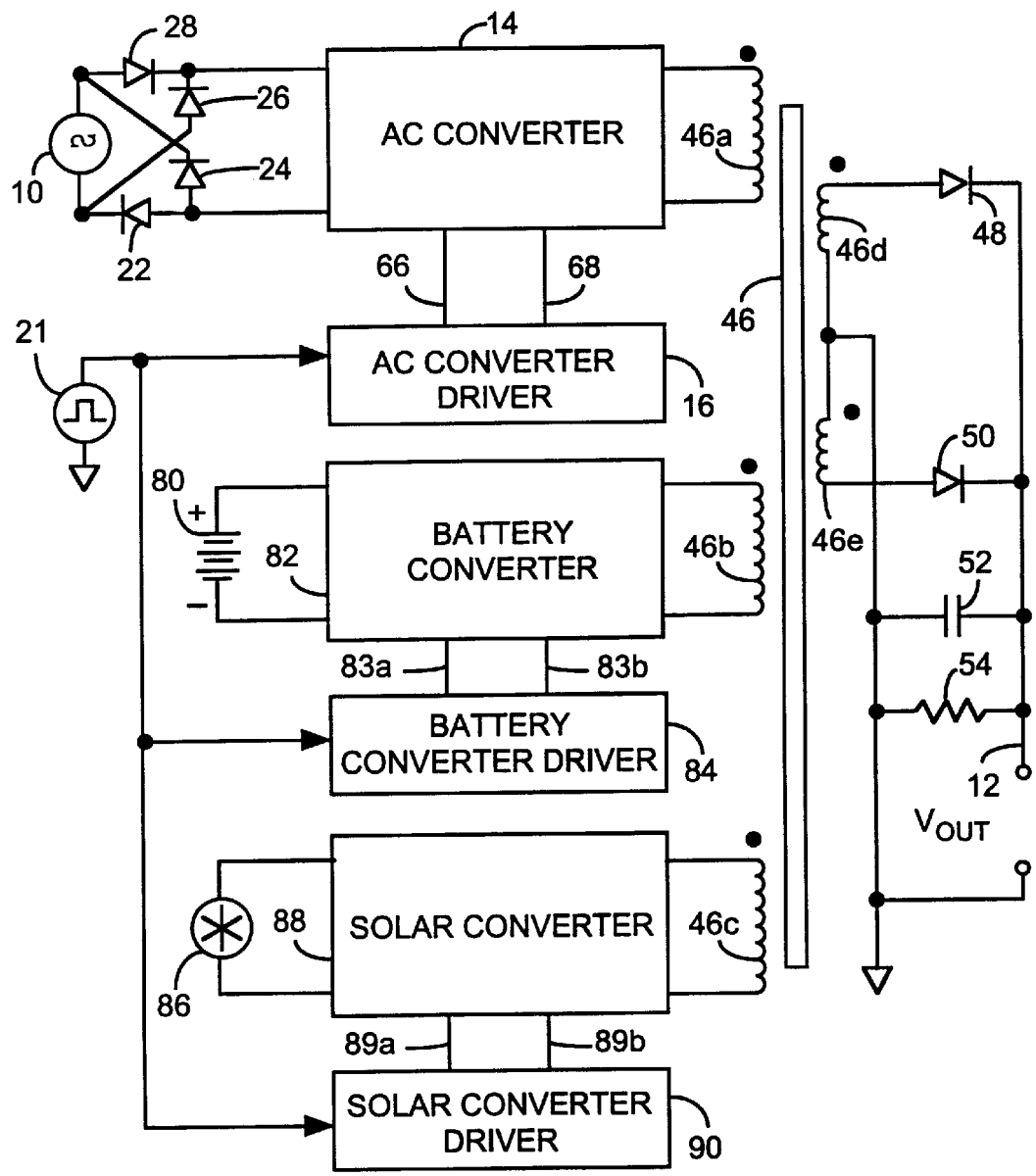
FIG. 2 is a block diagram of a multiple source power supply.

Referring to FIG. 2, a multiple source power supply is shown having the AC line source 10, a battery 80 and a solar collector 86 all three providing power to a load connected at Vout of line 12. Alternatively, the three power sources 10, 80 and 86 could be three phase AC line power sources, designated as phases, a, b, and c. The three input sources 10, 80 and 86 are connected to respective primary windings 46a, 46b and 46c of the output transformer 46, respectively through the AC converter 14, a battery converter 82 and solar converter 88. A battery converter driver 84 provides switching signals 83a and 83b driving the charging and discharging switches 56ab of the battery converter 82. A solar converter driver 90 provides switching signals 89a and 89b driving the charging and discharging switches 56ab of the solar converter 88. The common digital clock 21 is used to synchronize the operation of all three respective drivers 16, 84 and 90 for respective synchronized switching but with independent power factor correction, over voltage protection and current limiting functions.

Figure 3:
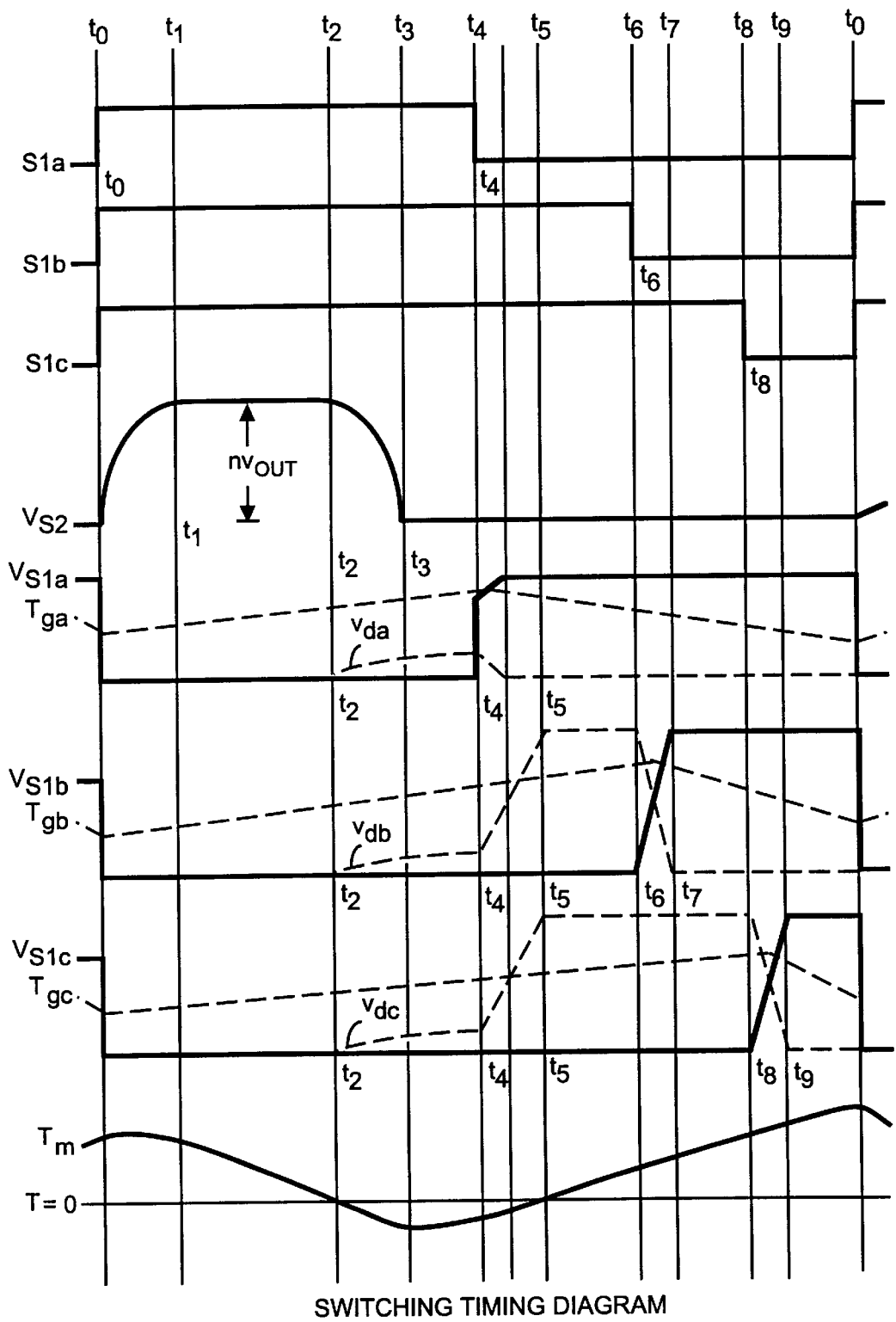
FIG. 3 is a timing diagram of the multiple source supply.

Referring to all of the Figures, and more particularly to FIG. 3, each of the switch drivers 16, 84 and 90 control the switching of the respective charging S1 switch 56a and the respective discharging S2 switch 56b, individually referred to as switches S1a, S1b, S1c and S2a, S2b and S2c, respectively, within the three converters 14, 82 and 88. The three converters 14, 82 and 88 are controlled in synchronization by turning on charging switches 56a, (S1a, S1b, and S1c ), and by turning off discharging switches 56b (S2a, S2b and S2c ), at the same time at the beginning of every switching cycle.

Power flows from each input source 10, 80 and 86, through each respective power converter, 14, 82 and 88, to the output load at Vout through the secondary windings 46d and 46c of the transformer 46 and the output circuit 48, 50, 52 and 54. Depending on the function of the power factor correction, over voltage or current limiting operation, the charging S1 switches 56a can be turned off and discharging S2 switches 56b can be turned on independently to meet the control requirements for the corresponding power factor correction. In each converter 14, 82 and 88, the charging switches S1 and discharging switches S2, are controlled in complimentary mode operation. The on-time interval within any switching cycle for each of the charging S1 switches 56a is set to be at least a minimum duty ratio of fifty percent to ensure sufficient time for transformer core resetting. At least this minimum on-time duration occurs in common synchronism to all of the switches 56a to accommodate transformer core resetting to prevent core saturation of the transformer 46. Staggered switching occurs in the second half of each switching cycle to enable discharging of stored energy without cross coupling of short circuit paths.

Each power converter 14, 82 and 88 includes the blocking diode 42 having a respective blocking voltage designated as Vda, Vdb and Vdc, respectively. The blocking diodes 42 in series with the associated transformer primary windings 46a, 46b or 46c provide high impedance paths which block the short circuit path of the closed state of the charging S1 switch 56a when the subject charging S1 switch is on, and when one of the other charging S1 switches in one of the other power converters off. Without the added blocking diode in each converter, a short circuit path is created across the transformer primary winding 46a by virtue of the closed state of the charging S1 switch 56a. The short circuit path is formed by the S1a switch and the protection diode 60 across the discharging S2a switch 56b of the same converter. Without short circuit blockage, the power intended to be transferred to the load from one of the converters would be short circuited and dissipated into power loss by the coupled short-circuit path in another power converter when charging with the corresponding charging S1 switch 56a is closed.

In the exemplar three power source configuration, every switching period preferably has ten time segments, t0 through t9. Magnetizing energy in the transformer core is reset each switching cycle having ten time segments t0–t9. The high state of S1a, S2a and S3b, means that the charging S1 switch is on and closed and the respective discharging S2 switch is off and opened. The voltage across all of the discharging S2 switches is shown as VS2. The voltages across the charging S1a, S1b and S1c switches 56a are designated as VS1a, VS1b and VS1c, respectively. The current through respective charging inductors 30 is designated as Iga, Igb and Igc, for each converter 14, 82 and 88.

During the first half duty cycle portion, t0–t3, of the timing cycle t0 to t9, all three converters are charging the respective charging inductor 30, with charging switches S1a, S1b and S1c on and closed, and the corresponding inductor current Iga, Igb and Igc increases as shown. The respective charging current Iga, Igb, and Igc through the S1a, S1b and S1c charging switches increase while the respective charging S1a, S1b and S1c provide a short circuit connection. The voltages across the charging switches VS1a, VS1b and VS1c, become non-zero as soon as the respective switches S1a, S1b, and S1c turn off causing the charging currents Iga, Igb, and Igc to start decreasing from their peaks during discharge into the respective primary windings 46a, 46b and 46c. The charging currents Iga, Igb, and Igc increase when the respective charging switch S1a, S1b and S1c are on, and decrease when off during discharge.

The VS2 voltage increases during to when the magnetizing current Im charges the switching capacitor 62. The VS2 voltage is clamped to NVout during time segment t1 and decreases during time segment t2 as the switching capacitor 62 discharges into the absorbing capacitor 44. The increasing and decreasing voltage VS2 across the discharging S2 switch is controlled by the resonance of the respective absorption capacitor 44, magnetization inductance 47, and the switching capacitor 62. The blocking diode voltages Vda, Vdb and Vdc are shown to slightly increase between time segments t2 to t4 as the absorption capacitor 44 developed the Vd voltage across the diode 42 during the discharge of the switching capacitor 62. The blocking diode voltages still increase slowly between time segments t3 to t4 as the absorption capacitors 44 developed the Vd voltage across the diodes 42 during the discharging of the magnetization current Im through diodes 60. The VS2 switch voltage becomes a zero at the time of switching on the discharging S2 switch 56b for zero voltage switching. All of the S2 switches experience zero voltage switching because the VS2 voltage declines from the reflected clamped output voltage level NVout to zero and remains at zero volt at time segment t3 and thereafter until the beginning of the next cycle at time segment to. The t4, t6 and t8 time segments show staggered switching and the blocking effect of the blocking diodes 42 shown by Vda, Vdb and Vdc. During the time segment t2, the Vd voltages increase from zero to small magnitudes indicating low voltage drops across the absorption capacitors 44 charged through discharge current paths of switching capacitors 62 connected across discharging S2 switches 56b to facilitate zero-voltage switching. The absorption capacitors 44 discharge residual absorbed stored charge to the transformer as soon as the respective discharging switches, S2a, S2b, and S2c, are turned on, providing efficient resetting of the voltages across the absorption capacitors 44 prior to subsequent energy absorption. This resetting facilitates zero-voltage switching of the discharging switches S2.

Voltages Vdb and Vdc are shown to rapidly increase to the reflected output voltage, NVout, when the corresponding b and c phase converters are still charging, and when Vda rapidly decreases to and remains zero when the corresponding a-phase converter is discharging. Vda decreases to zero as soon as the S1a switch is turned off because switch S2a is turned on. The increased voltage across the blocking diode voltages Vdb and Vdc reflects the blockage of the short circuit paths which would otherwise be coupled to the primary winding 46b and 46c of the transformer 46. When the switch S2a is on while S2b and S2c are off, the Vdb and Vdc voltages show a reversed biased blocking condition of the blocking diodes 42 for the b and c phase converters. When one converter is discharging and another converter is charging, the blocking diode of charging converter blocks the corresponding charging short circuit path so as not to couple that short circuit path onto the coupled primary windings 46abc, so that the discharging converter can discharge the corresponding discharging current into the corresponding primary winding without that primary winding having a coupled short circuit path so as not to interfere with the discharging operation.

The magnetizing current Im is shown as conducting through one of the primary windings. The magnetizing current Im is reset to a negative peak at time segment t3 every time the voltages across the discharging switches S2 reach zero from the reflected output voltage level NVout. The magnetizing current Im increases toward the positive peak from time segment t4 to t0, corresponding to the longest off state time interval of one of the switches S1. The magnetizing current decreases from a positive peak through zero to a negative peak when voltages across the discharging switches S2 are non-zero. From time segments t1 to t2, magnetizing energy is released through diode 50 to the load, providing high efficiency and core-resetting. Within the time segments t3 to t4, the magnetizing current Im remains relatively constant at the negative peak due to the low blocking voltage drop Vd across the magnetizing inductance 47. The waveform of the magnetizing current Im is bounded to show proper core resetting.

The improved boost converter blocks cross coupled short circuit paths enabling the coupling of multiple power sources to respective primary windings of an output transformer for efficient power transfer, power factor correction, yet retains the benefits of output transformer isolation, zero voltage switching, and magnetic core resetting. The improved boost converter enables the coupling of multiple input power sources to a single load with each input power source having respective power factor correction without cross coupling of short circuit paths.

The present invention may be further modified. For example, the blocking diode 42 may be replaced with a switch or relay. The absorbing capacitor 44 may be connected through suitable resistance to the switching capacitor 62. Multiple output voltages may be provided by additional secondary windings, rectifiers and filters. Those skilled in the art can make enhancements, improvements and modifications to enhance the invention. However, those enhancements, improvements and modifications may nonetheless fall within the spirit and scope of the following claims.

What is claimed is:

1. A converter for transferring power from a power source to a primary winding of an output transformer providing power to a load, the converter comprising, a charging means for storing energy during a charging time, a charging switch means for providing a short circuit path for controlling the charging of the charging means, a blocking means connected between the charging means and the primary winding, the blocking means is for blocking the short circuit path to the primary winding during the charging time, the blocking means provides high impedance to the primary winding during the charging time to prevent short circuit path coupling to the primary winding during the charging time, and a discharging switch means for controlling the discharging of the charging means during a discharging time, the charging means discharges energy through the primary winding and through the discharging switch means during the discharging time, the discharged energy in the primary winding is coupled through the output transformer to the load to transfer power to the load.

2. The converter of claim 1 wherein the charging switch means provides the short circuit path for conducting the charging current during the charging time, and an open circuit during the discharging time when the charging means discharges the stored energy to the primary winding.

3. The converter of claim 1 wherein the charging switch means and the discharging switch means are complimentarily operated providing open and closed conditions, the charging switch means closed and the discharging switch means opened during the charging time, and, the charging switch means is opened and the discharging switch means is closed during the discharging time.

4. The converter of claim 1 wherein the charging means is an inductor, and the charging switch means is a switch providing the short circuit path for conducting a charging current through the inductor to store energy in the inductor during the charging time.

5. The converter of claim 1 wherein the discharging switch means is another switch providing the discharging path for transferring the stored energy to the load through the output transformer, and the blocking means is a diode providing the high impedance preventing the short-circuit across the primary winding during the charging time.

6. The converter of claim 1 further comprising, a switching capacitor means connected across the discharging switch means for storing a stored charge from the discharged energy in the primary winding during the charging time, and an absorption capacitor means coupled to the switching capacitor means for absorbing the stored charge from the switching capacitor means for discharging the switching capacitor means to zero volts at the beginning of the discharging time.

7. The converter of claim 6 wherein the switching capacitor means is a capacitor storing charge released from the primary winding and later discharging the stored charge into the absorption capacitor means, through the primary winding, creating zero voltage across the discharging switch means at the end of the charging time, and the absorption capacitor means is another capacitor, connected in parallel with the blocking means for absorbing the stored charge from the switching capacitor means.

8. A power system for transferring power from a plurality of power sources to a load, the power system comprising, a transformer having a respective plurality of primary windings and a secondary winding connected to the load, a plurality of converters respectively connected between the primary windings and the power sources, each converter further comprises: a charging means for storing energy during a charging time; a charging switch means for providing a short circuit path for controlling the charging of the charging means; a blocking means connected between the charging means and the respective primary winding, the blocking means is for blocking the short circuit path to the respective primary winding during the charging time; and a discharging switch means for controlling the discharging of the charging means during a discharging time, the charging means discharges energy through the respective primary winding and through the discharging switch means during the discharging time to couple power from a respective one of the power sources to the load, and a plurality of respective switch drivers operating the charging switch means and the discharging switch means in a complimentary mode providing open and closed conditions, the charging switching means is closed and the discharging switching means is opened during the charging time, the charging switching means is opened and the discharging switching means is closed during the discharging time, and, the discharged energy in the primary winding is coupled through the output transformer to the load to transfer power to the load.

9. The system of claim 8 further comprising a respective plurality of controllers for respectively sensing the plurality of power sources and for respectively driving the plurality of switch drivers in the complimentary mode.

10. The system of claim 8 further comprising a respective plurality of power factor correction controllers for respectively sensing the plurality of power sources and for respectively driving the plurality switch drivers during power factor correction, each of the power factor correction controllers provide a respective pulse width modulated signal to a respective switch driver for controlling the amount of power delivered to the load.

11. The system of claim 8 further comprising a clock for providing periodic switching cycles, each of which for synchronizing the charging time of at least one half of the switching cycle and for staggering the discharging time during a second half of the switching cycle.

12. The system of claim 8 further comprising a clock for providing periodic switching cycles, each of which for synchronizing the charging time of at least one half of the cycle time and for staggering the discharging time during a second half of the switching cycle, at least one of the respective blocking means blocks a respective short circuit path during the respective charging time when another one of the plurality of converters is discharging during a respective staggered discharging time.

13. The system of claim 8 wherein each converter further comprises, a switching capacitor means connected across the discharging switch means for storing a stored charge from the respective primary winding during the charging time, and an absorption capacitor means coupled to the switching capacitor means for absorbing the stored charge from the switching capacitor means for discharging the switching capacitor means to zero volts at the beginning of the discharging time.

14. The system of claim 8 wherein, each of the blocking means is a diode connected between the respective charging means and the respective primary winding, and each of the charging and discharging switching means are semiconductor transistors.

15. The system of claim 8 wherein each of the charging means is a respective inductor, each of the blocking means is a diode connected between the respective inductor and the respective primary winding, each of the charging switch means is a respective charging transistor, each of the discharging switch means is a respective discharging transistor, each of the converters further comprise a switching capacitor connected across the discharging transistor for storing a stored charge from the respective primary winding during charging time, and an absorption capacitor connected between the respective charging means and the respective primary winding for absorbing the stored charge from the switching capacitor for discharging the switching capacitor to zero volts at the beginning of the discharging time.

16. The system of claim 8 wherein the plurality of power sources are three-phase AC voltages each full wave rectified to provide the respective converter with a power input.

17. The system of claim 8 wherein the plurality of power sources comprise a rectified AC power source, a battery power source, and a solar power source.

* * * * *